UNITED STATES PATENT OFFICE.

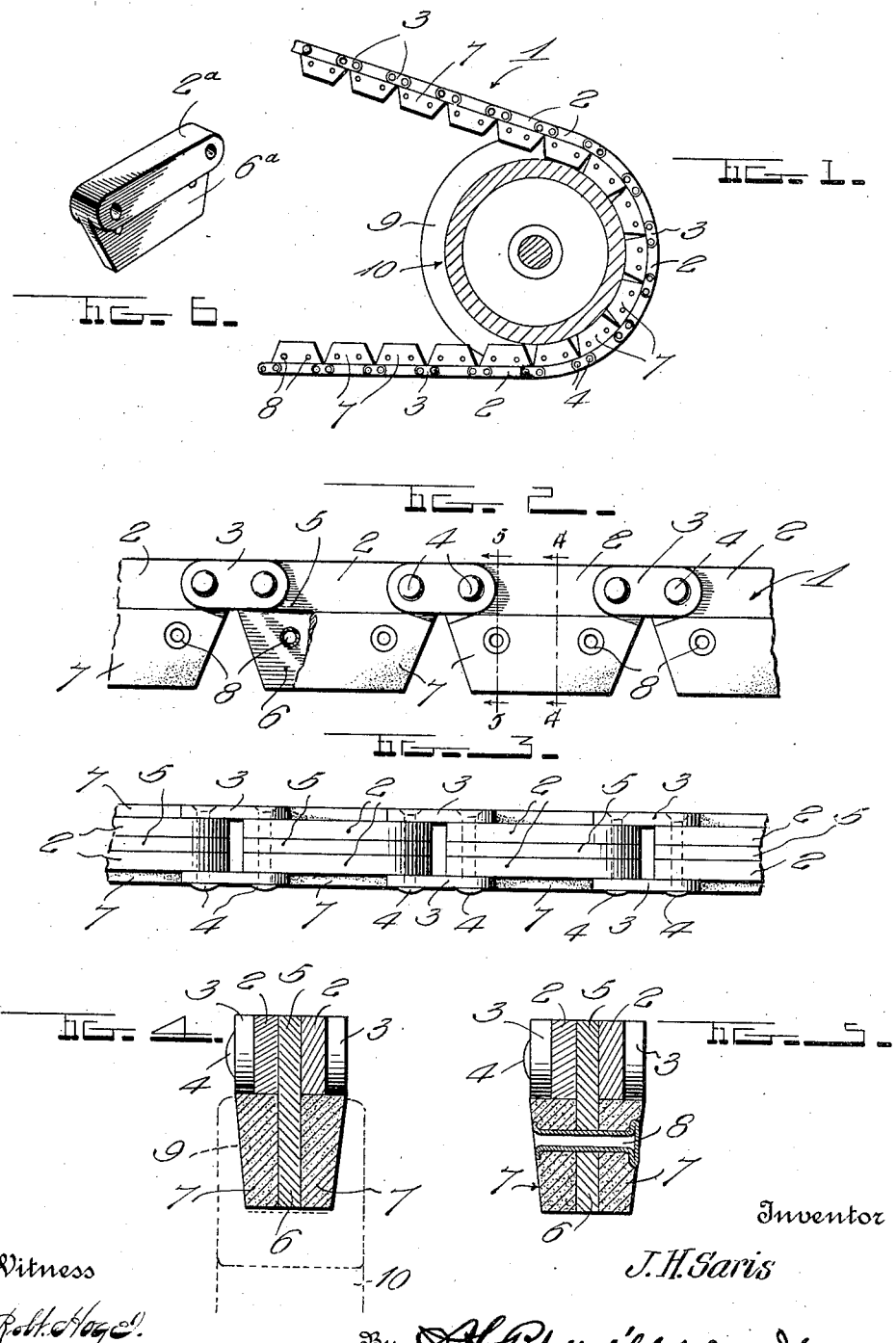

JOSEPH H. SARIS, OF BELOIT, WISCONSIN.

DRIVING-BELT.

1,312,580.  Specification of Letters Patent.  Patented Aug. 12, 1919.

Application filed June 7, 1918. Serial No. 238,668.

*To all whom it may concern:*

Be it known that I, JOSEPH H. SARIS, a citizen of the United States, residing at Beloit, in the county of Rock and State of Wisconsin, have invented certain new and useful Improvements in Driving-Belts; and I do declare the following to be a full, clear, and exact description of the invention, such as will enable others skilled in the art to which it appertains to make and use the same.

My invention has for its object to provide a driving belt embodying a metallic chain in such a manner as to greatly increase the strength and durability of the belt without in any manner decreasing its flexibility; and with this general object in view, the invention resides in the novel construction hereinafter fully described and claimed, and shown in the accompanying drawing wherein:

Figure 1 is a side elevation of a portion of the belt showing its application to a double-flanged pulley;

Fig. 2 is an enlarged side elevation of a portion of the belt with a part of one of the facings removed;

Fig. 3 is an elevation of the outer edge of the belt;

Figs. 4 and 5 are transverse sections on the planes indicated by the lines 4—4 and 5—5 respectively of Fig. 2; and Fig. 6 is a detail perspective view showing a slightly different form of construction.

In Figs. 1 to 5 of the drawings above briefly described, the numeral 1 designates as a whole, a metallic chain, said chain including pairs of spaced parallel main links 2, pairs of auxiliary links 3 connecting said main links, and rivets 4 pivoting the links 2 and 3 together. Clamped between the main links 2 and extending therefrom at the inner edge of the belt, are metal plates 5 extending longitudinally, said plates being secured in place by the same rivets which connect the main and supplemental links 2 and 3. The projecting portions 6 of the plates 5 form central longitudinal flanges, and facings 7 of leather or of any other preferred friction creating material are secured against opposite sides of said flanges by rivets or the like 8. The outer sides of the facings are inclined sufficiently to properly engage the side flanges 9 of any pulley around which the belt passes, such as that indicated at 10 in the drawings.

Fig. 6 discloses a different form of construction, in which a main link $2^a$ is illustrated having a central longitudinal flange $6^a$ formed integrally with its inner edge, it being intended that a plurality of links such as $2^a$ shall be connected by auxiliary links in the manner above set forth, and that facings similar to the facings 7 shall be secured against opposite sides of the flanges.

From the foregoing, taken in connection with the accompanying drawing, it will be obvious that I have provided a driving belt of comparatively simple and inexpensive nature, yet one which will be highly efficient and in every way reliable. The chain 1 imparts greater strength and durability to the device than can be maintained from an all leather or fiber belt, and the facings 7 insure proper frictional engagement of the belt with the pulleys around which it passes. The belt is of particular advantage upon motorcycles employing what is commonly known as the V-belt drive, but it is to be understood that it is not restricted to use in any particular field. Since probably the best results are obtained from the details shown and described, they are preferable, but within the scope of the invention as claimed, numerous minor changes may well be made.

I claim:

1. A driving belt comprising a chain having central inwardly extending longitudinal flanges on its links, and facings of friction creating material secured against the opposite sides of said flanges.

2. A driving belt comprising a chain consisting of pairs of main links and auxiliary links connecting them, flat plates extending longitudinally of the chain and secured between said main links, a portion of said plates extending inwardly from said links to form longitudinal flanges, and facings of friction creating material secured against opposite sides of said flanges.

In testimony whereof I have hereunto set my hand.

JOSEPH H. SARIS.

Witness:

J. W. DAY.